June 12, 1956 T. A. WETZEL 2,749,812
BALL BEARING NUT AND SCREW MECHANISM
Filed July 21, 1952 2 Sheets-Sheet 1

INVENTOR
Theodore A. Wetzel
BY
Attorney

June 12, 1956 T. A. WETZEL 2,749,812
BALL BEARING NUT AND SCREW MECHANISM
Filed July 21, 1952 2 Sheets-Sheet 2
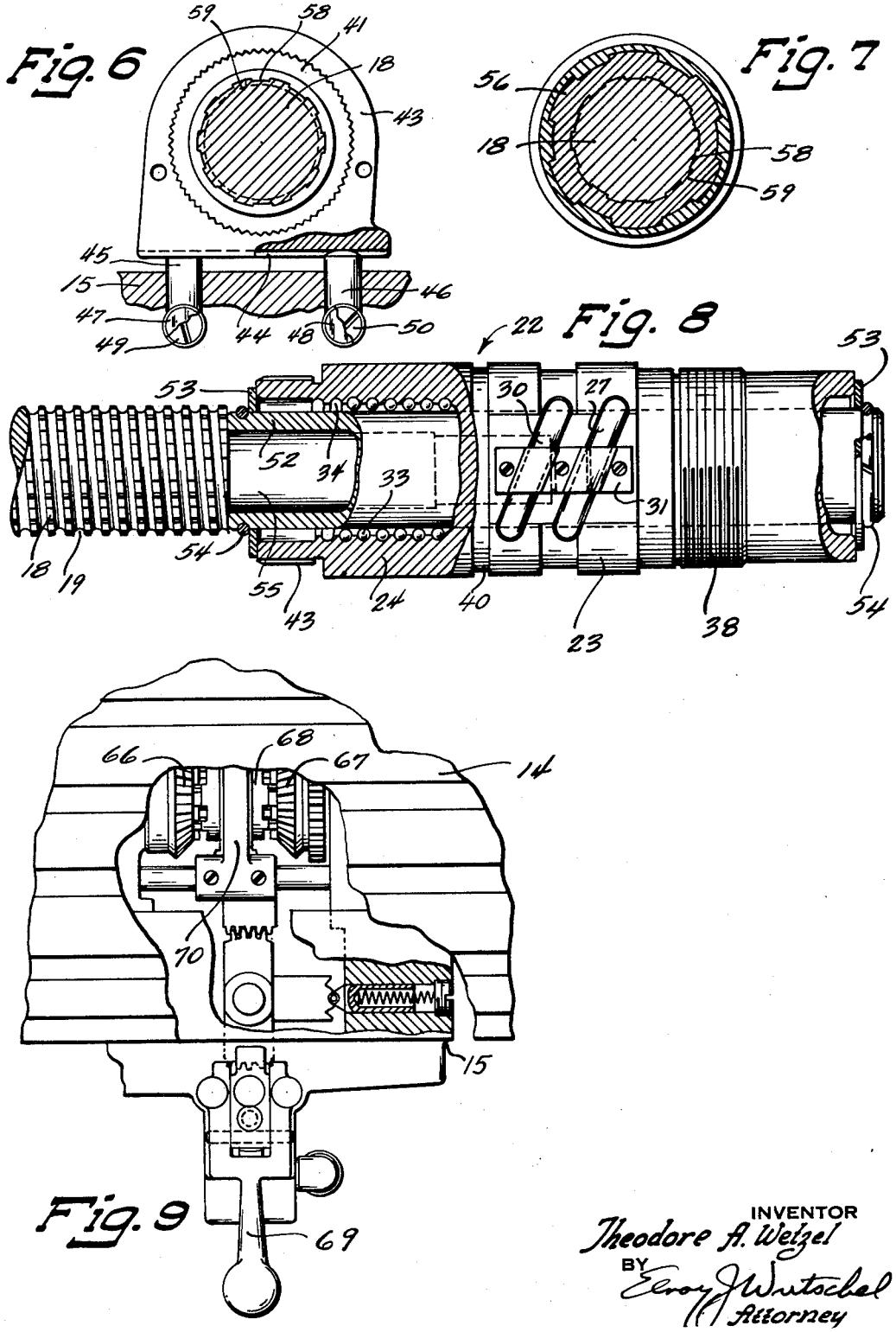
INVENTOR
Theodore A. Wetzel
BY
Elroy J. Wutschel
Attorney United States Patent Office 2,749,812
Patented June 12, 1956

2,749,812

BALL BEARING NUT AND SCREW MECHANISM

Theodore A. Wetzel, Milwaukee, Wis., assignor to Kearney & Trecker Corporation, West Allis, Wis., a corporation of Wisconsin Application July 21, 1952, Serial No. 300,080

4 Claims. (Cl. 90—22)

This invention relates generally to an improved ball bearing nut and screw driving mechanism for a machine tool and, more particularly to an improved backlash compensator and driving apparatus for an antifriction screw and nut actuating mechanism of the recirculating ball type.

In an antifriction type screw and nut actuating mechanism, a screw provided with a continuous helical ball receiving groove is operatively engaged by a plurality of bearing balls that are constrained for continuous recirculating movement within a cooperating nut presenting a complementary internal helical ball receiving groove having its opposite ends connected by a return tube. The internal groove of the nut and a portion of the helical screw groove cooperate with the return tube of the nut to provide a continuous pathway permitting continuous recirculating movement of the antifriction bearing balls to minimize friction as the screw and nut are relatively rotated. In those conditions of operation requiring extreme accuracy with a minimum of axial backlash of the screw relative to the nut, it has been necessary to employ the highest standards of accuracy during manufacture and assembly. To reduce backlash to a minimum, there can be no variation in either the lead or the size of the helical grooves respectively formed in the screw and the cooperating nut. Likewise, specially selected ball bearings of an exactly uniform size must be used in order to minimize lash between the screw and nut when the balls are operatively engaged therebetween. In spite of these precautions and the necessarily great expense of manufacture, however, it is virtually impossible to remove all of the backlash between the screw and nut. In addition to this, no provision is made for removing backlash that may develop from wear after continued use.

The primary object of the present invention is to provide an improved backlash compensator in an antifriction screw and nut mechanism of the recirculating ball type.

Another object of the invention is to reduce the cost of manufacture of an antifriction screw and a cooperating recirculating ball type nut.

Another object is to provide an adjusting mechanism adapted to retain the bearing balls of a recirculating ball type nut in snug rolling engagement with the complementary ball races formed in the screw and nut respectively.

Another object is to provide an improved driving connection between an axially slidable drive sleeve and the periphery of a feed screw having a helical ball race adapted to be engaged by a recirculating ball type nut.

A further object is to provide an improved driving conection to the helically grooved portion of an antifriction feed screw that will not interfere with the rolling engagement of a plurality of bearing balls constituting the medium of engagement between the screw and a cooperating nut of the recirculating ball type.

According to this invention, a ball bearing nut and feed screw actuating mechanism operatively connected to effect feeding movement of a work table relative to a supporting saddle is provided with an improved backlash compensator and an improved driving mechanism operative to rotate the screw without interfering with the recirculating movement of the bearing balls within the nut mechanism. The feedscrew is provided with a helically formed ball race of semicircular cross section and a plurality of extremely shallow, longitudinally extending driving splines so formed in the peripherally threaded portion of the screw as not to impinge upon the effective ball bearing portion of the ball race. The backlash compensator comprises a cooperating feed nut of the recirculating ball type formed in two separate sections spaced in endwise abutting engagement and that are disposed to engage the feed screw for relative angular displacement to each other. Each section of the backlash compensator constitutes a separate nut element provided with a complementary internal helically formed ball race having its opposite ends connected by a return ball pathway. Separate sets of antifriction balls constrained within each of the nut elements for recirculating movement are disposed to engage spaced apart portions of the helical ball race in the screw and are adapted to have rolling engagement therewith whenever the screw is rotated. One of the nut elements is fixedly secured to the saddle and the other of the nut elements is threaded along the screw for relative angular adjustment into a predetermined degree of endwise abutting engagement with the fixed nut element. Adjusting means are provided to retain the angularly adjustable ball bearing nut element in a predetermined degree of tightness with the stationary ball bearing nut element for eliminating any axial backlash of the screw relative to the cooperating nut elements. For rotating the helically grooved feed screw relative to the cooperating ball bearing nut elements, there is provided an internally splined drive sleeve adapted to engage the shallow driving splines of the feed screw and that is journalled in fixedly spaced relationship to the cooperating nut elements. Power operable means are connected to selectively rotate the drive sleeve for effecting a simultaneous rotative and lineal movement of the antifriction feed screw relative thereto.

The foregoing and other objects of this invention, which will become more fully apparent from the following detailed description, may be achieved by the particular apparatus illustrating an exemplifying embodiment of the invention that is depicted in and described in conjunction with the accompanying drawings, in which:

Fig. 6 is a view in transverse vertical section showing the adjusting means for the backlash compensator, taken along the line 6—6 in Fig. 1;

Fig. 7 is a view in transverse vertical section through the driving mechanism for the helically grooved feed screw, taken along the line 7—7 in Fig. 1;

Fig. 8 is a view partly in elevation, and partly in vertical section illustrating a simplified method of assembling the ball bearing nut mechanism on the screw; and, Fig. 9 is an enlarged fragmentary plan view of the table with parts broken away to show the directional driving mechanism for the antifriction screw.

Figure 1:
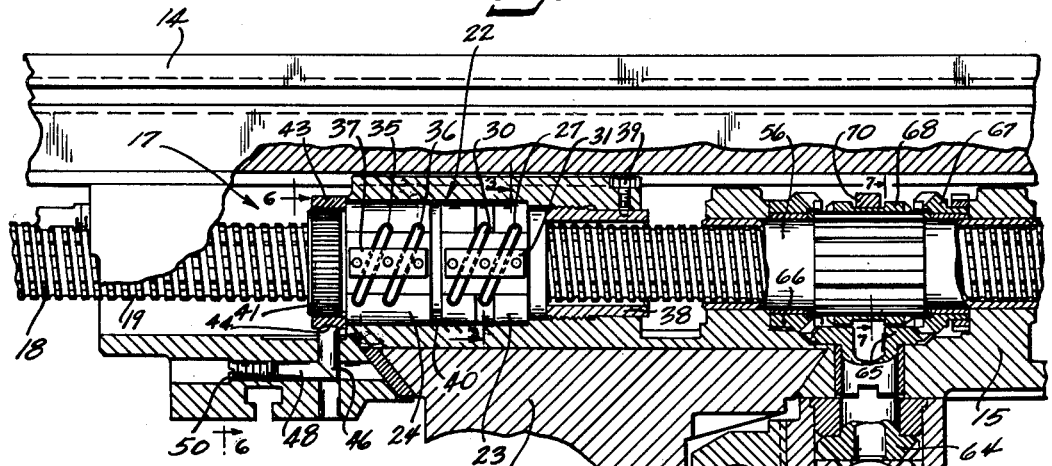
Figure 1 is an enlarged fragmentary view in vertical longitudinal section of a machine tool table and saddle structure showing a backlash compensator incorporated in a ball bearing nut and screw driving mechanism.

The particular mechanism shown in Fig. 1, as illustrative of a preferred embodiment of apparatus incorporating the features of this invention, is represented as being utilized to drive the work table of a milling machine which may be of any suitable construction. Although the invention may be employed to drive a work supporting element of any machine tool, it is especially adapted to be used in copying machines such as the machine fully shown and described in my copending patent application entitled Copying Machine With Anticipator Control, Serial No. 246,980, filed September 17, 1951. In copying machines operative to perform a full 360° contouring operation, it is particularly advantageous to employ a ball bearing nut and screw actuating mechanism in order to obtain an extremely rapid response to the copy control system. In spite of the fact that a ball bearing nut and screw mechanism is relatively friction free in operation and possesses the required high degree of response, however, there is usually a slight axial backlash between the cooperating members. Although this backlash is of no consequence in some applications, it does interfere with operating efficiency in machine tools. In copying machines particularly, any backlash between the cooperating screw and nut members may effect an error in the configuration of a contour being generated. The present invention completely obviates any backlash without impairing the extremely high degree of operating efficiency and rapid response of a ball bearing nut and screw mechanism. At the same time, the present invention provides a convenient means of driving an antifriction screw relative to its cooperating ball bearing nut without interfering with the rolling movement of the recirculating balls constituting the medium of engagement between the cooperating members. It is to be understood, however, that the improved backlash compensator and drive mechanism may be incorporated with equal advantage and utility in any machine incorporating a ball bearing nut and screw mechanism for translating rotary into linear motion.

Referring now to the drawings, and particularly to Fig. 1 thereof, a work supporting table 14 of a machine tool is slidably mounted on a saddle 15 that is in turn slidably mounted on a knee 16 for transverse movement, the relatively slidably superimposed members cooperating to form a work supporting structure for the machine. Selective longitudinal movement of the work table 14 relative to the supporting saddle is effected by means of a ball bearing nut and screw actuating mechanism 17, operatively connected between the saddle 15 and the table 14. The nut and screw mechanism 17 comprises a rotatable feed screw 18 provided with a helically formed semicircular groove 19 constituting a ball race and that is adapted to cooperate with an adjustable ball bearing nut mechanism 22. At its opposite ends, the table 14 is provided in well known manner with a pair of end brackets (not shown) in which the feed screw 18 is journalled to rotate relative to the nut mechanism 22 which is secured to the saddle 15. Selective rotation of the screw 18 in the required direction operates to effect a rectilinear longitudinal movement of the work table 14 in a selected direction relative to the supporting saddle 15.

Figure 2:
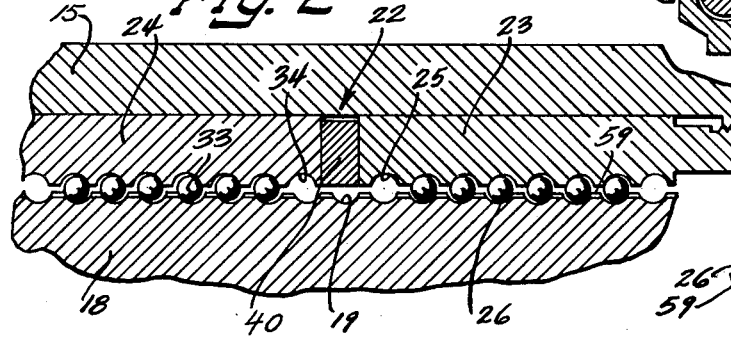
Fig. 2 is an enlarged fragmentary view in vertical longitudinal section through the backlash compensator.

To obviate axial backlash of the screw 18, as shown in Figs. 1 and 2, the cooperating ball bearing nut mechanism 22 is provided with a stationary nut element 23 fixedly secured within the saddle 15 and a rotatably adjustable nut element 24, threaded along the screw into endwise abutting engagement with the stationary nut element. Inasmuch as the nut elements are of similar construction, only the stationary nut element 23 will be described in detail.

Figure 3:
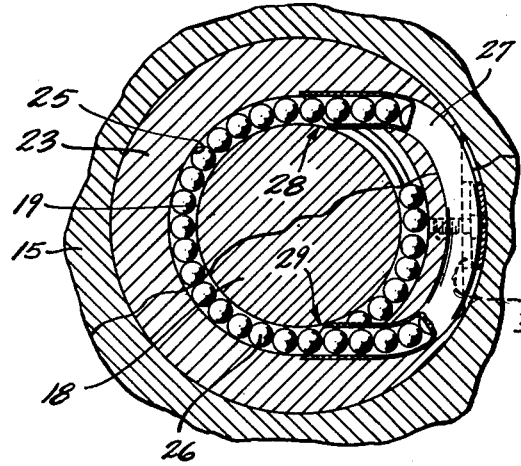
Fig. 3 is a view in transverse vertical section through the ball bearing nut and screw mechanism showing the continuous ball pathway formed in one of the cooperating nut elements and taken generally along the line 3—3 in Fig. 1.

As shown in Figs. 2 and 3, the stationary ball bearing nut element 23 is provided with an internal helical groove 25 of semicircular cross section complementary to the helical groove 19 formed in the screw 18 and that is likewise disposed to constitute a ball race. The complementary helical grooves 25 and 19 respectively formed in the fixed nut element 23 and the screw 18 cooperate in such a manner as to constitute an enclosed ball race for receiving a plurality of antifriction bearing balls, such as the ball 26, that form the medium of engagement therebetween. To minimize friction whenever the feed screw 18 is rotated relative to the nut element 23, the antifriction balls 26 are retained in rolling engagement between the complementary helical races 19 and 25 respectively formed therein. To effect this result, a return ball pathway is provided in the stationary nut element 23 for permitting a continuous recirculating movement of the bearing balls 26.

As shown in Figs. 1 and 3, a return tube 27 extending diagonally across the outer periphery of the stationary nut element 23 is provided with inwardly extending open ends 28 and 29 arranged to deflect the balls 26 from their rolling path of movement between the cooperating helical grooves 19 and 25. The return tube 27 together with that portion of the internal helical groove 25 in the nut 23 between the ends 28 and 29 of the tube, as well as a portion of the cooperating helical groove 19, form one continuous pathway or closed circuit permitting continuous recirculating movement of one portion of the bearing balls 26. The fixed nut element 23 is provided with two separate closed circuits, the second being constituted in part by another return tube 30 shown in Fig. 1 to form a continuous pathway for another portion of the bearing balls 26 forming the medium of engagement between the cooperating helical grooves 25 and 19. A plate 31 secured to the fixed nut element 23 by means of filister head screws is disposed to retain the return tubes 27 and 30 in proper operating relationship to the nut element.

In a similar manner, the rotatable ball bearing nut element 24 is disposed to constrain a plurality of antifriction bearing balls 33, Fig. 2, for recirculating movement and into rolling engagement between an internal groove or ball race 34 formed therein and a portion of the helical groove 19 in the cooperating feed screw 18. The rotatable nut element 24 is likewise provided with two return tubes 35 and 36 respectively constituting in part, two separate closed circuits or enclosed pathways for guiding separate portions of the balls 33 constituting the medium of engagement between the complementary helical grooves respectively formed in the adjustable nut element 24 and the screw 18. The return tubes 35 and 36 are retained in proper relationship to the adjustable nut element 24 by a plate 37 that is secured thereto by means of filister head screws.

To fixedly maintain the adjustable nut mechanism 22 within the saddle 15, the stationary nut element 23 is provided with an integrally formed threaded end 38 that is threaded into a complementary threaded opening formed in the saddle and fixedly locked against rotation by means of a set screw 39. The rotatable or adjustable nut element 24 is then threaded on the feed screw 18 and rotated into endwise abutting engagement relative to the fixed nut element 23, a fitting or spacing washer 40 being interposed therebetween to properly position the bearing balls 33 of the nut element 24 with respect to the helical groove 19 of the screw. Both of the nut elements 23 and 24 are retained within an enlarged horizontally bored opening formed in the saddle 15.

To eliminate backlash between the feed screw 18 and the nut mechanism 22, the rotatable or adjustable nut element 24 is adapted to be rotatably adjusted along the screw 18 into a predetermined degree of tightness with the non-rotatable and fixedly mounted nut element 23. To this end, the adjustable nut element 24 is integrally formed with an outwardly extending end 41 provided with external serrations adapted to be engaged by an internally serrated adjusting ring or collar 43. At its lower edge, the adjusting collar 43 is provided with a transversely extending concave groove 44 or abutment surface adapted to be engaged at spaced apart positions by the convex upper ends of a pair of vertically movable adjusting rods 45 and 46 slidably carried in the saddle 15. The adjusting rods 45 and 46 are provided with angularly inclined lower ends adapted to slidably engage the complementary angular ends of a pair of horizontally slidable actuating rods 47 and 48 respectively. Each of the horizontally movable actuating rods 47 and 48 is slidably carried within suitable horizontally bored openings formed in the saddle 15. A pair of adjusting screws 49 and 50 threaded in the saddle 15 for selective independent adjustment are adapted to engage the actuating rods 47 and 48 respectively to effect a selective vertical movement of the adjusting rods 45 and 46. By means of this arrangement, the adjusting screws 49 and 50 are operative to rotate the adjustable nut element 24 into a predetermined angularly adjusted position of abutting engagement relative to the fixed nut element 23. The rotatable nut element 24 is restrained against rightward movement by its abutting engagement against the fixed nut element 23. Likewise, since the rotatable nut element 24 is locked in a selected position of angular adjustment with respect to the stationary nut element, the engagement of the feed screw 18 with the respective nut elements operates to restrain the adjustable nut element 24 against leftward movement.

To adjust the ball bearing nut mechanism 22 for eliminating backlash, the adjustable nut element 24 is rotated along the screw 18 into an approximate or rough position of abutting engagement with the spacing collar 40 adjacent to the fixed nut element 23. After effecting the preliminary rough positioning of the rotatably adjustable nut element 24, the internally serrated adjusting collar 43 is positioned upon the externally serrated outer end 41 thereof in a selected position of angular adjustment. The adjusting screws 49 and 50 are then rotated to urge the convex upper ends of the adjusting rods 46 and 47 into abutting engagement with the complementary concave groove 44 or abutment surface formed on the underside of the adjusting collar 53. The convex upper ends of the adjusting rods 49 and 50 engage the concave groove 44 to prevent endwise movement of the adjusting collar as well as to retain it in a selected position of angular engagement with the rotatable nut element 24. Selective individual manipulation of the adjusitng screws 49 and 50 then operates to both adjust and clamp the rotatable nut element in a selected degree of abutting engagement with the stationary nut element 23.

Angular adjustment of the rotatable nut element 24 into a tighter degree of endwise abutting engagement with the stationary nut element 23 operates to exert outwardly opposed axial forces against the opposite faces of spaced apart portions of the helical ball race 19 formed in the feed screw 18. With the nut mechanism 22 adjusted to eliminate backlash as shown in Fig. 2, for example, the recirculating bearing balls 26 are urged into engagement between the rightward circular face of the groove 19 in the screw 18 and the leftward or inner face of the complementary helical race 25 formed in the fixed nut element 23. At the same time, the recirculating balls 33 are urged into engagement with the leftward face of a spaced apart portion of the race 19 and the rightward or inner face of the complementary helical ball race 34 in the angularly adjustable nut element 24. Thus, the separate sets of antifriction balls 26 and 33 are retained in any predetermined degree of tightness between the helical race 19 formed in the screw and the cooperating helical races 25 and 34 respectively formed on the nut elements 23 and 24 to completely eliminate backlash therebetween.

Figure 5:
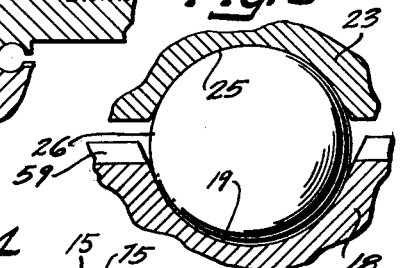
Fig. 5 is an enlarged detailed fragmentary view in longitudinal section through the ball race formed by the cooperating helical races respectively formed in the feed screw and a cooperating nut element.

The adjustable nut mechanism 22 of the recirculating ball type constitutes an improved backlash compensator that is adapted to eliminate any backlash that might result from slight variations between the size of the cooperating helical races respectively formed in the feed screw 18 and the cooperating ball bearing nut mechanism 22. As shown in the enlarged detailed view, Fig. 5, the cooperating helical races 19 and 25 are preferably formed to exact identical size for receiving one of the antifriction balls 26. Even under the best conditions and the highest manufacturing standards, however, this exactness in the relative size of the ball races is difficult to maintain. Furthermore, such extreme precision of manufacture contributes greatly to the cost of the usual select ball bearing nut and screw mechanism. Likewise, as explained hereinbefore, it is virtually impossible to manufacture a ball bearing screw and cooperating single nut of the recirculating ball type that is completely free from backlash in spite of the high standards of manufacture.

Another principal advantage of the adjustable ball bearing nut mechanism 22 is that backlash can be removed without appreciably increasing the torque required for driving the rotatable screw 18 and with no impairment in the relative friction free operation thereof. This is particularly important in copying machines of the type fully described in the aforementioned patent application in which the feed screw must be relatively friction free in order to respond immediately to the demands of the copy control system. The extremely slight increase in torque required to drive the feed screw 18 is also of considerable advantage in conventional milling machines that are adaptable for climb cutting operations. In backlash compensators employed in screw and nut mechanisms of the conventional Acme or V-thread type, for example, there is a loss in efficiency and a considerable increase in the power required to drive the screw. With the conventional screw and nut mechanism, it is likewise extremely difficult and in some cases impossible to effect manual rotation of the screw for adjusting the position of a machine element or work support. With the ball bearing backlash compensator 22 shown in Fig. 1, however, this condition could not be caused no matter how tightly the rotatable nut element 24 is adjusted relative to the fixed nut element 23. Regardless of the tightness of adjustment, the two sets of bearing balls 26 and 33 would still be in rolling engagement between the screw race 19 and the cooperating races 25 and 33 of the adjustable nut mechanism. With this construction therefore, there could not be the wedging or clamping action that could occur with extreme tightening of a backlash compensator associated with the conventional Acme or V-type thread of a nut and screw actuating mechanism.

Since the helical groove 19 in the screw 18 forms a part of the enclosed race for retaining the bearing balls in the recirculating nut mechanism 22, it will be apparent that the balls will drop out of position whenever the nut mechanism is removed from the screw 18. Although the nut mechanism 22 is not usually manually removed from the screw 18 excepting during initial assembly or for repairs or adjustment, the reassembly of a ball bearing nut and screw mechanism is an extremely tedious and time consuming procedure. After the nut mechanism is replaced on the screw, it is necessary to remove the return tubes and replace the bearing balls into their operative position forming the medium of engagement therebetween. To simplify and facilitate the initial assembly of a ball bearing screw and nut mechanism, there is provided a hollow assembly plug 52 shown in Fig. 8. The assembly plug 52 is provided with an outer diameter of sufficient size to retain the bearing balls in engagement with the helical grooves 25 and 33 formed in the nut elements 23 and 24 respectively. As the bearing balls are inserted in the nut mechanism, therefore, it is necessary only that they engage the internal helical grooves of the nut mechanism and the outer periphery of the assembly plug 52. Initial assembly of the ball bearing nut mechanism on the assembly plug removes the necessity of simultaneously engaging the bearing balls between the helical groove 19 of the screw 18 and the complementary helical grooves of the nut. The assembled nut mechanism 22 and the cooperating recirculating balls 26 and 33 contained therein are retained on the assembly plug 52 by means of washers 53 and snap rings 54.

To assemble the nut mechanism 22 on the cooperating screw 18, the assembly plug 52 is provided with a bored opening that is slidably received upon an outwardly extending end 55 of reduced diameter formed on the screw. With the assembly plug 52, positioned over the end 55 of the screw 18 and in abutting engagement with the threaded portion thereof, the nut mechanism can be threaded directly into engagement with the helical ball race 19 after removal of the inner snap ring and washer. In a similar manner, the nut mechanism 22 can be removed from the screw 18 and replaced on the assembly plug 52 without displacing any of the bearing balls from their operative positions within the recirculating nut mechanism.

To rotate the screw 18 for effecting a rectilinear movement of the table 14 relative to the saddle 15, there is provided a rotatable drive sleeve 56 journalled in the saddle in fixedly spaced relationship to the nut mechanism 22 as shown in Fig. 1. The drive sleeve 56 is provided on its inner circumference with a plurality of extremely shallow driving splines 58 or serrations disposed to slidably engage a plurality of shallow driving splines 59 or serrations formed on the helically threaded portion of the screw 18 as shown in Fig. 7. Rotating the drive sleeve 56 operates to rotate the screw 18 for effecting a lineal advancement of the screw 18 relative thereto, due to its threaded engagement with the ball bearing nut mechanism 22.

The slidably splined engagement of the screw 18 with the drive sleeve 56 is so arranged that it does not interfere with the recirculating movement of the bearing balls 26 and 33 within the cooperating nut elements 23 and 24 and into operative engagement with the helical race 19 of the screw 18. As more clearly shown in the enlarged detail view, Fig. 5, the depth of the helical race 25 in the nut element is less than the radius of the bearing balls 26. Although the depth of the helical race 19 in the screw exceeds the radius of the individual balls 26, the effective bearing portion thereof is substantially equal to the race 25. The extreme upper portion of the helical groove 19 in the screw 18, that is, the portion above the effective pitch diameter of the groove, is relieved slightly. The extremely shallow longitudinal driving splines 59 or serrations are formed in the periphery of the screw to intersect only the upper or relieved portion of the helical ball race 19 formed therein. Preferably, the depth of the driving splines or serrations formed in the screw are less than one third the depth of the total depth of the helical ball receiving groove presented thereby. Even though the splines 59 are extremely shallow in depth, they provide sufficient torque capacity for driving the screw 18 without interfering with the rolling engagement of the antifriction balls 26 or 33 along the helical race 19 formed therein.

Power for rotating the internally splined drive sleeve 56 for driving the feed screw 18 to move the work table 14 is derived from a power source (not shown) connected to drive a bevel gear 60 journalled in a bracket 61 secured to the saddle 15 as shown in Fig. 1. From the bevel gear 60, power is transmitted through a meshing bevel gear 64 connected directly to drive another bevel gear 65. The gear 65 in turn is disposed to meshingly engage a pair of reversing bevel gears 66 and 67 journalled to rotate on the drive sleeve 56. As shown in Figs. 1 and 9, the reversing bevel gears 66 and 67 are provided with clutch teeth that are disposed to be engaged by complementary clutch teeth formed on the opposite ends of a clutch collar 68 that is splined to the outer periphery of the drive sleeve 56 for selective axial shifting movement. To shiftably move the clutch collar 68 into engagement with one or the other of the reversing bevel gears 66 and 67, there is provided a pivotally mounted directional shifter lever 69 connected to actuate a slidable shifter fork 70 that engages an annular groove formed on the clutch collar. Actuating the directional shifter lever 69 operates to shift the clutch collar 68 from a neutral disengaged position, shown in Figs. 1 and 9, into engagement with a selected one of the bevel gears 66 and 67 to transmit power to the drive sleeve 56 for rotating the feed screw 18 to effect rectilinear movement of the work table 14 in a selected direction.

Figure 4:
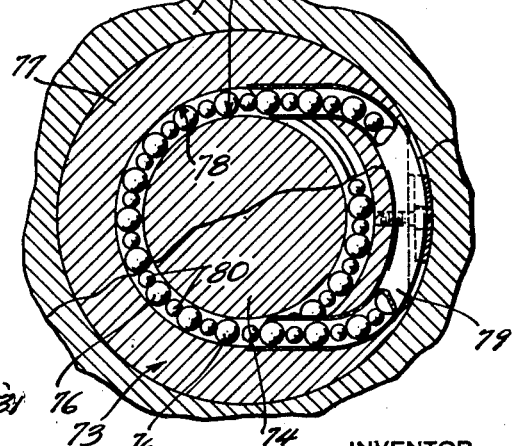
Fig. 4 is a view in transverse section through a modified form of ball bearing nut and screw mechanism.

Referring now to Fig. 4, there is provided a modified form of ball bearing nut and screw actuating mechanism 73 adapted to be used in combination with the improved adjustable backlash compensator hereinbefore described. As there shown, a rotatable feed screw 74 is provided with a helical groove 75 adapted to be engaged by a plurality of bearing balls 76 of large diameter that are constrained for recirculating movement within a cooperating stationary nut element 77, the latter being secured to the saddle 15. The nut element 77 is provided with an internal helical ball race 78 complementary to the groove in the screw and disposed to cooperate therewith to constitute an enclosed race for receiving the large diameter balls 76 forming the medium of engagement therebetween. A return tube 79 extending diagonally along the outer periphery of the nut element 77 is provided with inwardly extending open ends connecting the opposite ends of the helical groove 78 to form a continuous pathway or closed circuit for the bearing balls. To minimize friction, each of the large diameter bearing balls 76 constituting the medium of engagement between the screw 74 and nut element 77 is separated from the next bearing ball by a spacer ball 80 of a relatively small diameter. As the screw 74 is rotated relative to the nut element 77, all of the large diameter bearing balls 76 are caused to roll in the same direction of rotation. At the same time, the alternately placed spacer balls 80 are caused to roll in the opposite direction of rotation. Since the spacer balls 80 are smaller in diameter than the bearing balls 76, only the latter are disposed to fully engage the cooperating helical races in the screw 74 and the nut element 77. The smaller diameter spacer balls 80 serve to reduce friction still further since they do not fully engage the cooperating helical races as they are urged to roll in the opposite direction of rotation to the bearing balls 76.

From the foregoing detailed description of the illustrative structure set forth herein to disclose the principles of this invention, it is apparent that there has been provided an improved backlash eliminator and driving mechanism for an antifriction screw and nut actuating mechanism of the recirculating ball type. Although the invention is shown as being particularly adapted for use in combination with the movable elements of a machine tool, it may be utilized in other types of machines with equal advantage and utility.

Although the illustrative embodiment of the invention herein set forth has been described in considerable detail in order to make a full disclosure of practical operating mechanism, it is to be understood that the apparatus described is intended to be illustrative only and that the various novel features may be incorporated in other structural forms without departing from the spirit and scope of the invention as defined in the subjoined claims.

The principles of this invention having now been fully explained in connection with the foregoing description, I hereby claim as my invention:

1. In a power transmitting mechanism for a machine tool, an antifriction screw and nut actuating mechanism comprising a feed screw provided with a helical ball receiving race and a plurality of longitudinally extending serrations parallel to the axis of said screw, said screw being so formed that the serrations are less than one third the depth of the helical ball receiving race presented thereby, a stationary nut element presenting a complementary internal helical ball race, an enclosed pathway connecting the opposite ends of the race in said stationary nut element to provide a closed circuit for recirculating antifriction balls, a set of bearing balls constrained for recirculating movement within said nut element in a manner to be in rolling engagement with a portion of the said race in said screw and the said cooperating race in said stationary nut element, a second nut element rotatably mounted on said screw for movement into abutting engagement with said stationary nut element and being provided with an internal helical ball race, an enclosed pathway connecting the opposite ends of the race in said second nut element, a second set of bearing balls constrained for recirculating movement within the said rotatable nut element for rolling engagement between a portion of the race in said screw and the cooperating race in said rotatable nut element, a locking collar presenting an abutment surface secured to said rotatable nut element, spaced apart actuating plungers adapted to operatively engage spaced apart portions of the abutment surface formed on said collar for regulating the angular displacement of said rotatable nut element to said stationary nut element, locking means operatively connected to lock said actuating plungers in a selected position of adjustment to retain said rotatable nut element in a selected position of abutting engagement with said stationary nut element, an internally serrated drive sleeve disposed to engage the said serrations extending along said screw, said drive sleeve being carried for rotation a fixed distance from said stationary nut element, and power operable means connected to selectively rotate said drive sleeve for effecting rotatable movement of said screw relative to said stationary nut element.

2. In an actuating mechanism for a machine tool, a stationary antifriction nut element of the recirculating ball type, a rotatable antifriction feed screw operatively engaged by said fixed nut element, said feed screw presenting a helically formed ball receiving groove of semicircular cross section and a plurality of extremely shallow longitudinally extending driving splines intersecting the crest constituted by the peripheral surface joining the opposite sides of the groove formed therein, a set of bearing balls constrained within said fixed nut element for rolling engagement with a portion of the helical groove presented by said screw, a rotatable antifriction nut element of the recirculating ball type threaded on said screw into endwise abutting engagement with said fixed nut element, a second set of bearing balls constrained for recirculating movement in said rotatable nut element for rolling engagement with a spaced apart portion of the groove presented by said screw, locking means connected to adjust the degree of tightness between said nut elements to selectively preload the separate sets of bearing balls respectively interposed between the groove in said screw and said nut elements, said antifriction nut elements being adapted to eliminate axial lash between said screw and said nut elements, said screw being so formed that the helical groove presented thereby is relieved slightly toward the crest to prevent the splines presented thereby from interfering with the rolling movement of said sets of bearing balls, an internally splined rotatable driving sleeve adapted to slidably engage the axially extending splines presented by said screw, said rotatable driving sleeve being carried in axially fixed spaced relationship to said stationary nut element, and power operable means connected to rotate said driving sleeve for in turn rotating said feed screw.

3. As an article of manufacture, an antifriction screw provided with a helically formed ball receiving groove of substantially semicircular cross section and having a crest of uniform diameter joining the opposite sides of the groove presented thereby, said screw being adapted to provide a spiral raceway for receiving bearing balls in the groove presented thereby, and said screw being provided on its grooved periphery with longitudinally extending driving splines disposed to intersect the crest separating successive portions of the helical groove presented thereby, said screw being so formed that the driving splines presented thereby are less than one-third of the depth of the helical ball receiving groove presented thereby.

4. In an antifriction type ball bearing nut and screw actuating mechanism for a machine tool, a ball bearing screw provided with a helically formed ball receiving groove of semi-circular cross-section and having a crest of uniform diameter joining the opposite sides of the groove presented thereby, a cooperating ball bearing nut being provided with a cooperating helically formed semi-circular ball receiving groove, a return tube connected between the opposite ends of the helical groove in said nut to complete a continuous bearing ball pathway, a plurality of bearing balls constrained within said nut for recirculating movement between the helical ball receiving groove in said nut and a portion of the cooperating helical groove in said screw as well as said return tube, said screw being provided with a plurality of extremely shallow external driving splines formed along the helically grooved portion thereof and being disposed to intersect the crest separating successive portions of the helical groove presented thereby, said screw being so formed that the lowermost portions of the splines therein are positioned radially outward from that portion of the helical screw groove that is engaged by the said bearing balls constrained within said recirculating nut, and a rotatably journalled internally splined sleeve engaging the external splines presented by said ball bearing screw for relative slidable movement.

References Cited in the file of this patent

UNITED STATES PATENTS

| | | |
|---|---|---|
| 2,191,131 | Martellotti | Feb. 20, 1940 |
| 2,195,799 | Parsons | Apr. 2, 1940 |
| 2,325,678 | Holmes | Aug. 3, 1943 |
| 2,385,907 | Armitage et al. | Oct. 2, 1945 |
| 2,402,290 | Nenninger et al. | June 18, 1946 |
| 2,498,897 | Riedel | Feb. 28, 1950 |

FOREIGN PATENTS

| | | |
|---|---|---|
| 562,932 | Great Britain | July 21, 1944 |